US012663560B2

(12) United States Patent
Brand et al.

(10) Patent No.:  US 12,663,560 B2
(45) Date of Patent:  Jun. 23, 2026

(54) METALENS WITH CORRECTED PHASE

(71) Applicant: Mitsubishi Electric Research Laboratories, Inc., Cambridge, MA (US)

(72) Inventors: Matthew Brand, Newton, MA (US); Dayu Zhu, Atlanta, GA (US); Keisuke Kojima, Weston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1079 days.

(21) Appl. No.: 17/663,011

(22) Filed: May 11, 2022

(65) Prior Publication Data

US 2023/0367035 A1     Nov. 16, 2023

(51) Int. Cl.
*G02B 1/00*       (2006.01)
*G06F 30/20*      (2020.01)
*G06F 111/14*     (2020.01)
*G06F 119/18*     (2020.01)

(52) U.S. Cl.
CPC ............. *G02B 1/002* (2013.01); *G06F 30/20* (2020.01); *G06F 2111/14* (2020.01); *G06F 2119/18* (2020.01)

(58) Field of Classification Search
CPC ..... G02B 1/002; G06F 30/20; G06F 2111/14; G06F 2119/18

USPC ........................................................... 703/2
See application file for complete search history.

(56) References Cited

PUBLICATIONS

Kolarik_2019 (Spiral Arrangement: From Nanostructures to Packaging, Journal of Electrical Engineering, vol. 70 2019, No. 1, 74-77) (Year: 2019).*

* cited by examiner

*Primary Examiner* — Brian S Cook
(74) *Attorney, Agent, or Firm* — Gene Vinokur

(57) ABSTRACT

A computer-implemented method is provided for designing a metalens. The metalens has a metasurface including nano-structures arranged on a substrate based on preliminary simulation data. The method includes partitioning the nano-structures into overlapping d-unit supercells such that every non-perimeter nano-structure is at the center of one d-unit supercell, computing a differentiable mapping function of the d-unit supercells that predicts the near-field over the unit cell at the center of the supercell from the design parameters of all the nanostructures in the supercell, jointly tuning the design parameters of all unit cells in the metalens to better approximate a target near field distribution over the entire metalens, by using a Jacobian of partial derivatives provided by the mapping function to solve for a locally optimal correction of all design parameters, and generating a fabricable design of the metalens based on the optimized parameters.

10 Claims, 7 Drawing Sheets

400

METALENS WITH CORRECTED PHASE

FIELD OF THE INVENTION

The present disclosure relates generally to a metalens having a metasurface, more specifically to a system and a method for designing a metalens.

BACKGROUND OF THE INVENTION

A metasurface is a planar arrangement of wavelength-scale structures that interact with an electric and/or magnetic field. Optical metasurfaces, a.k.a. metalenses, interact with visible and near-visible wavelengths and offer exquisite control of wavefronts with potential for substantial miniaturization of opto-electronics. In practice, metalenses fall well short of theoretically predicted efficiencies, and are not yet competitive with conventional bulk lenses and mirrors. The dominant design strategy is to decompose the metalens into a grid of cells, calculate the desired optical phase delay for each grid cell, and select, from a library of pre-simulated nanostructures, one that provides the appropriate phase delay. For nano structures that exhibit phase delays according to the predictions of Pancharatnam-Berry (PB) theory, the design problem is particularly simple: the relative phase delay is expected to vary linearly with the rotational orientation of the nano structure. However, in practice meta lenses designed on the unit cell principle suffer from unmodeled light-matter interactions and resonant couplings between nearby nanostructures, especially at high numerical apertures (NA). Accordingly, there is a need to develop a novel data processing (system) to solve the above problems.

SUMMARY OF THE INVENTION

The present disclosure is based on recognition that a fast optimization that simultaneously tunes all unit cells can improve the near field distribution and performance of the optic, mainly by correcting for interactions between nearby cells. This improves the focusing efficiency of high-NA metalenses by 5-9%, as validated in high-resolution FDTD simulations.

Arrays of nano-scale waveguides have proven to be an attractive design motif for metalenses, due to high efficiency and a simple design process in which the geometry of each waveguide is independently determined via the theory of Parabancham-Berry phase. We show that the phase delays are in fact not independent, and give a correction which results in significantly higher focal efficiencies.

Some embodiments of the present invention are based on recognition that there have been extensive efforts to find families of nanostructures that provide independent phase shifts as expected in the unit cell decompositions. However, in practice, unanticipated resonant couplings between nearby nanostructure perturb the realized phase delays away their intended values. The couplings and the resultant perturbations are not well understood, but are observed to reduce the efficiency and overall performance of the metalens.

Some embodiments are based on recognition that a computer-implemented method constructs a differentiable phase-predicting function or electric-field-predicting function from simulations of small neighborhoods of cells, and use this function to jointly optimize, in Newton iterations, the realized phase delay of overlapping neighborhoods that cover the entire metalens, thereby obtaining significant increases in focal efficiency. The chief insights are (1) one can construct, from simulation data, a differentiable predictor of the electric field above the middle cell of a small neighborhood; (2) this function is approximately separable into functions of overlapping smaller neighborhoods, therefore one does not need an exponential number of expensive simulations to accurately model the unknown physics; (3) the derivative of this function can be used to obtain a (locally) optimal metalens design by solving a short sequence of banded linear systems of equations for corrections to nano structure geometries in overlapping neighborhoods that cover the metalens.

Further, since a data conversion system and a computer-implemented method for a data conversion according to embodiments of the present invention provide special computing strategies for determining candidate tool positions, the data conversion system and the computer-implemented method of the present invention may reduce central processing unit (CPU) usage, power consumption, and/or network bandwidths.

According to some embodiments of the present invention, a computer-implemented method is provided for designing a metalens. The metalens has a metasurface including nanostructures arranged on a substrate based on preliminary simulation data. The method uses a processor coupled with a memory storing a target near field profile, the preliminary simulation data of the metalens and instructions implementing the method, wherein the preliminary simulation data represent first design parameters including geometry and orientation angle with respect to the nano-structures on the metalens. The instructions, when executed by the processor, carry out at steps of the method, including partitioning the nano-structures into overlapping d-unit supercells such that every non-perimeter nano-structure is at the center of one d-unit supercell, computing a differentiable mapping function of the d-unit supercells that predicts the near-field over the unit cell at the center of the supercell from the design parameters of all the nanostructures in the supercell, by fitting an interpolator to preliminary simulation data of the d-unit supercells, jointly tuning the design parameters of all unit cells in the metalens to better approximate a target near field distribution over the entire metalens, by using a Jacobian of partial derivatives provided by the mapping function to solve for a locally optimal correction of all design parameters, and generating a fabricable design of the metalens based on the optimized parameters.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

Figures 1A, 1B, 1C:
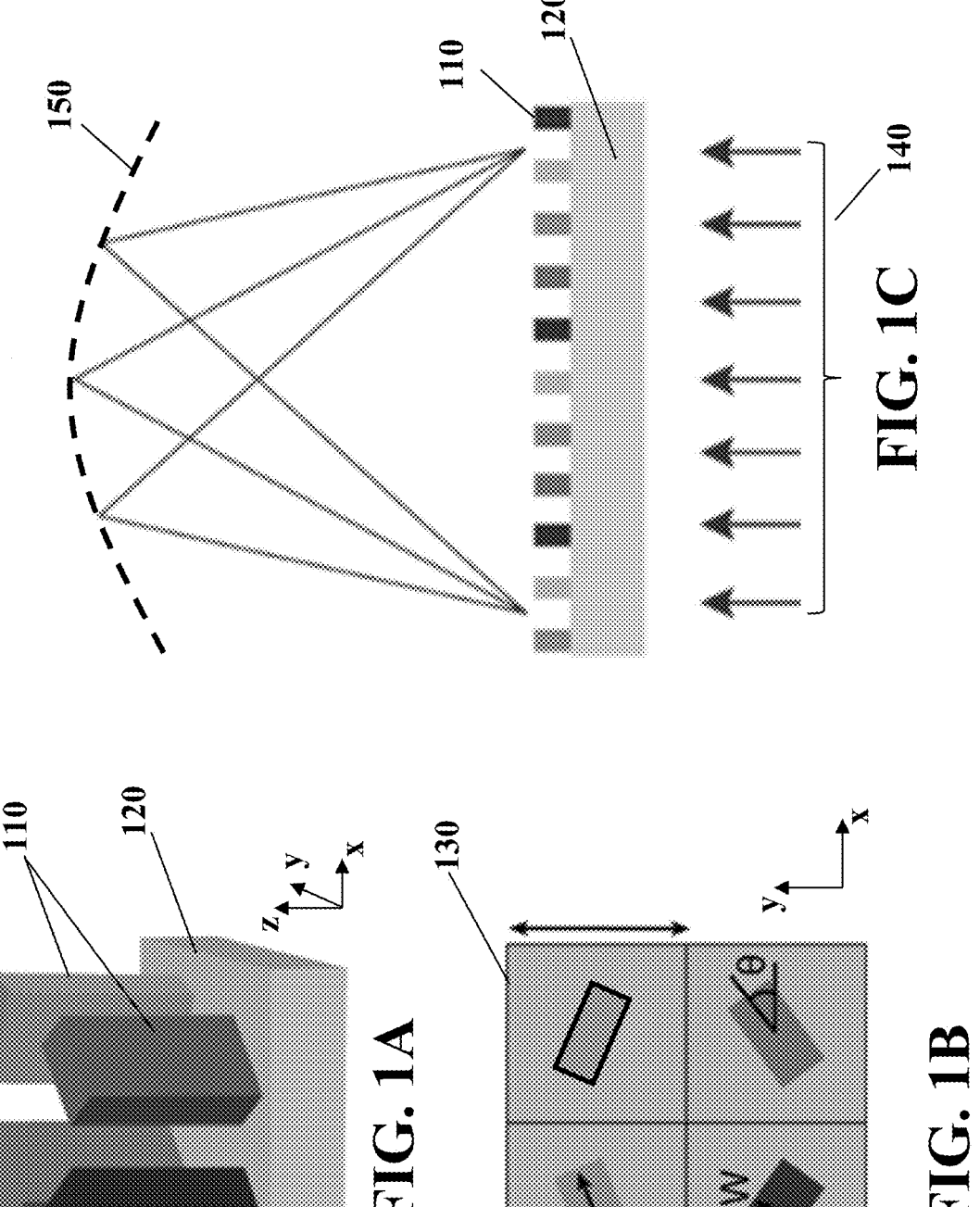
FIG. 1A shows a fragment of a metalens consisting of four oriented nano pillars on a substrate.
FIG. 1B shows an overhead view of a metalens fragment, divided into four equal-sized unit cells, three of which contain nano pillars of each having a specified width, length, and orientation angle.
FIG. 1C shows a side view of a metalens fragment with arrows below signifying an incident planar electromagnetic wavefront and lines above signifying a scattering pattern provided by the nano pillars.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram.

Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Accordingly, some embodiments of the present disclosure can reduce a power consumption of a computer (processor) and improve the functions of a computational system.

In some embodiments of the present disclosure, the system can be effectively and accurately performed with less time and less computing power, thus the use of a method or system described in the present disclosure can reduce central processing unit usage and power consumption.

We introduce a fast joint optimization of unit cells across the whole metasurface, exploiting interactions between nearby cells to produce a target (desired) near-field profile and improving whole-device efficiency. Joint optimization means that all design parameters for the entire metasurface are simultaneously tuned to maximize the overall performance of the device, taking into account interactions between different parts of the device; this is contrasted with local or greedy optimization wherein just one or a small subset of parameters is tuned to improve performance in one part of the metasurface, but often degrading performance elsewhere.

Unit cell decomposition (UCD) has become the dominant design strategy for optical metalenses. UCD views a metalens as a grid of nano-structures that can be chosen independently to control the near field. UCD-designed lenses have demonstrated steadily improving focusing efficiencies, but fall short of theoretical predictions (and may be supplanted by freeform designs once simulation and fabrication challenges are resolved). One reason for the efficiency gap is that the electric field effect associated with an individual nano-structure is often based on periodic assumptions (i.e., the nano-structure identically tiles the plane), but when it is placed in a heterogeneous neighborhood of varied nano-structures, unmodeled coupling effects can substantially alter this response. Attempts to correct for this generally use extended supercell simulations in generate-and-test loops to find an alternate nano-structure that provides the target near field in the context of its neighbors. These one-at-a-time search procedures are of limited effectiveness and are very expensive computationally, even when a pre-trained neural network is used as a proxy for the simulator.

We note that most simulator proxies are differentiable with regard to their inputs—not just their parameters—and thus provide an unexploited derivative for direct tuning of unit cell parameters. More powerfully, this opens to door to jointly optimizing all cells in the metalens to produce a target (desired) near field distribution by solving a short sequence of linear equations, each with special structure enabling linear time and space complexity. Thus, a metalens of millions of cells can be quickly optimized with modest computing resources. We apply this to the design of focusing TiO$_2$ nano-fin metalenses, previously designed via UCD according to the Pancharatnam-Berry (PB) phase theory, and obtain significant improvements in focusing efficiency.

FIG. 1A shows a fragment of a metalens consisting of four oriented nano pillars on a substrate. FIG. 1B shows an overhead view of a metalens fragment, divided into four equal-sized unit cells, three of which contain nano pillars of each having a specified width, length, and orientation angle. This figure shows a side view of a metalens fragment with arrows below signifying an incident planar electromagnetic wavefront and lines above signifying a scattering pattern provided by the nano pillars.

The nano-fins 110 are typically oriented rectangular pillars fabricated on a substrate 120 (FIG. 1A) arranged in a regular grid 130 (FIG. 1B) in vast numbers, each introducing a local phase delay such that a planar wavefront 140 passing through the metalens (FIG. 1C) is reshaped in an optically useful manner, e.g. into a spherical wavefront that diverges 150 or converges to a point on a far-field focal plane.

Figures 2A, 2B, 2C:
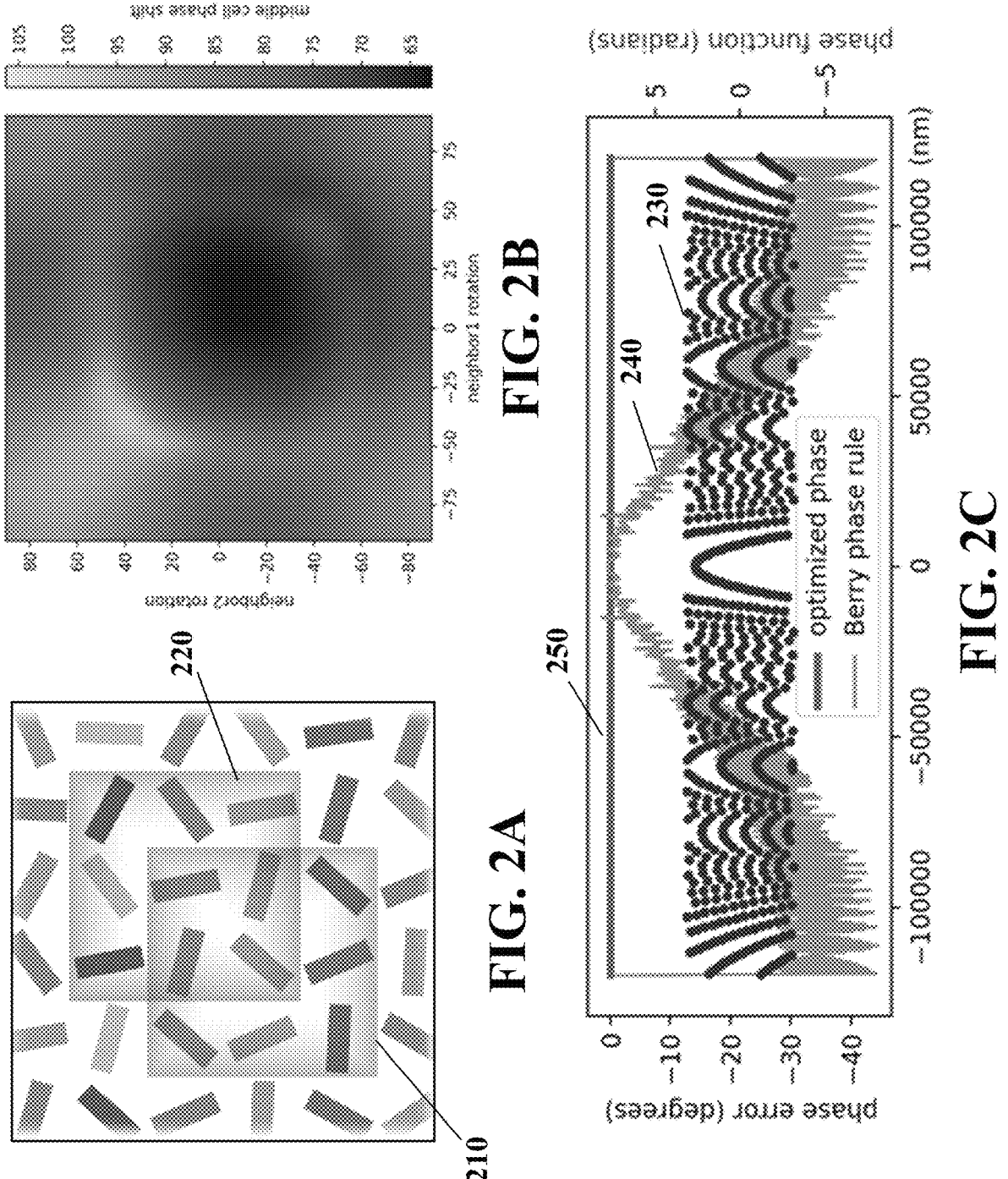
FIG. 2A shows an overhead view of a metalens fragment with two overlapping 3×3 neighborhoods of unit cells highlighted by grey squares, according to embodiments of the present invention.
FIG. 2B is a plot showing how the average phase delay provided by a single unit cell varies when the nano pillar orientation angles of two of its neighboring cells are varied.
FIG. 2C is a plot of the near field phase provided by a high-numerical-aperture focusing metalens, according to some embodiments of the present invention.

FIG. 2A shows an overhead view of a metalens fragment with two overlapping 3×3 neighborhoods of unit cells highlighted by grey squares. FIG. 2B is a plot showing how the average phase delay provided by a single unit cell varies when the nano pillar orientation angles of two of its neighboring cells are varied. FIG. 2C is a plot of the near field phase provided by a high-numerical-aperture focusing metalens, with the dots 230 signifying an ideal phase profile targeted (desired) for efficient focusing, the grey jagged curve 240 indicated the phase error incurred when using the prior art to design the metalens, and the straight line 250 at top indicating the near-zero phase error incurred when using the method according to the present invention.

FIG. 2A shows an example of a metalens design method according to some embodiments of the present invention. The method is summarized as follows: (a) A metalens is partitioned into densely overlapping neighborhoods 210 and 220, here 3×3 (FIG. 2A), each known as a supercell. (b) A differentiable function f is fitted to supercell simulation data to predict the near field response of each neighborhood's middle cell from the neighborhood's design parameters, e.g., nano-fin orientations. As an example FIG. 2B shows that the average right-circularly-polarized phase delay in the middle-cell near field varies by more than 40° as two neighboring nano-fins are rotated. (c) Finally, design parameters for all cells in the metalens are jointly optimized to produce a target near field phase delay pattern. FIG. 2C shows an instance where this process improved a poorly focusing metalens to one that perfectly focuses (within physical limits) by tuning the orientation of all nano-fins so that the average phase shift of every cell matches the target value for a focusing lens, thereby increasing focal efficiency by >5%.

PB theory predicts that the phase shift offered by a suitably shaped waveguide is simply twice its planar orientation angle, i.e. f($\theta$)=2$\theta$. For instance, Khorasaninejad et al. describes an extensive computational search in homogeneous locally periodic unit-cell simulations to find a nano-fin geometry that provides phase shifts as per PB theory and that also provide good transmission efficiency in Science: "Mohammadreza Khorasaninejad, Wei Ting Chen, Robert C. Devlin, Jaewon Oh, Alexander Y. Zhu, Federico Capasso, "Metalenses at visible wavelengths: Diffraction-limited focusing and subwavelength resolution imaging," Science 3 Jun. 2016, vol. 352 issue 6290."

Some embodiments of the present invention are based on the recognition that we found that f has nonlinearities and dependencies on nearby nano-fins that can produce phase errors >±20° (see jagged phase error curve in FIG. 2C) as revealed in detailed finite-difference time-domain (FDTD) simulations of heterogeneous supercells. In addition, there are nano-fin geometries that provide superior transmission efficiency, but with larger deviations from ideal PB behavior. We use one such geometry here: 265×95×600 nm TiO$_2$ nano-fins on SiO$_2$ substrate in a 325 nm square grid. Generally, we observe deviations from PB phase when corners of adjacent nano-fins are close, indicating coupling effects, and when the phase shift varies substantially between adjacent fins, typically wherever a metalens provides nontrivial beam deflection. E.g., in FIG. 2C, the PB phase error grows to >40° near the metalens rim, though the relative phase error between adjacent cells is more modest, providing decent beam deflection. Nonetheless, this leaves room for optimization.

Figure 3:
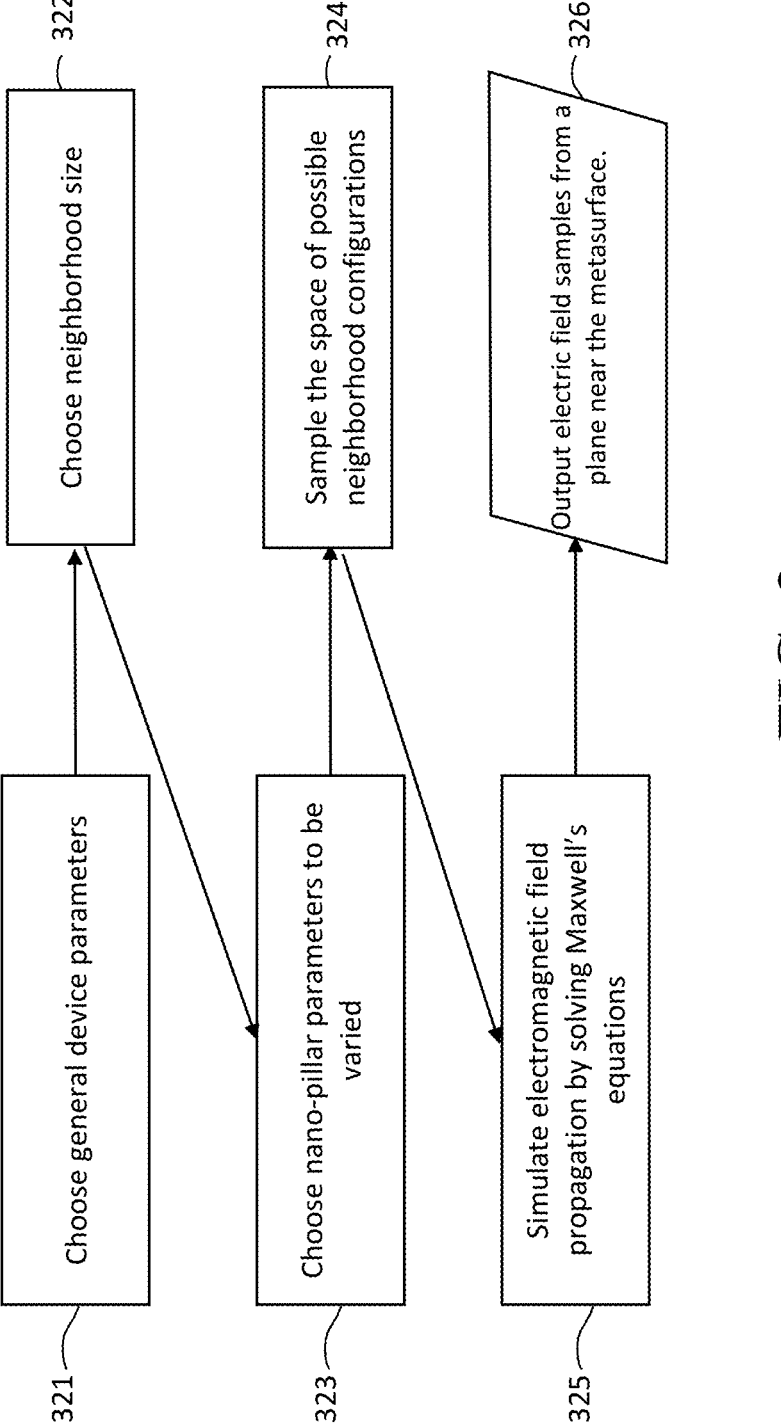
FIG. 3 shows the process of acquiring simulation data to be used in training a predictor, according to some embodiments of the present invention.

FIG. 3 shows the process of acquiring simulation data to be used in training a predictor according to some embodiments of the present invention. First, general device parameters such as size, frequency band, and grid spacing are chosen in step 321. A neighborhood size is chosen in step 322 small enough to allow fast simulation but large enough to capture physical interactions between a central nanostructure and those near it. Often those interactions are pairwise and a 3×3 neighborhood suffices.

One chooses nano-pillar parameters to be varied in step 323. Typically these parameters govern the shape and/or placement of a nano-pillar in its grid cell. The process samples the space of possible neighborhood configurations in step 324. For the sampled neighborhood configurations of nano-structures of the metalens, the process simulates electromagnetic field propagation by solving Maxwell's equations in step 325 and outputs electric field samples from a near-field plane beyond the metasurface in step 326.

Figure 4:
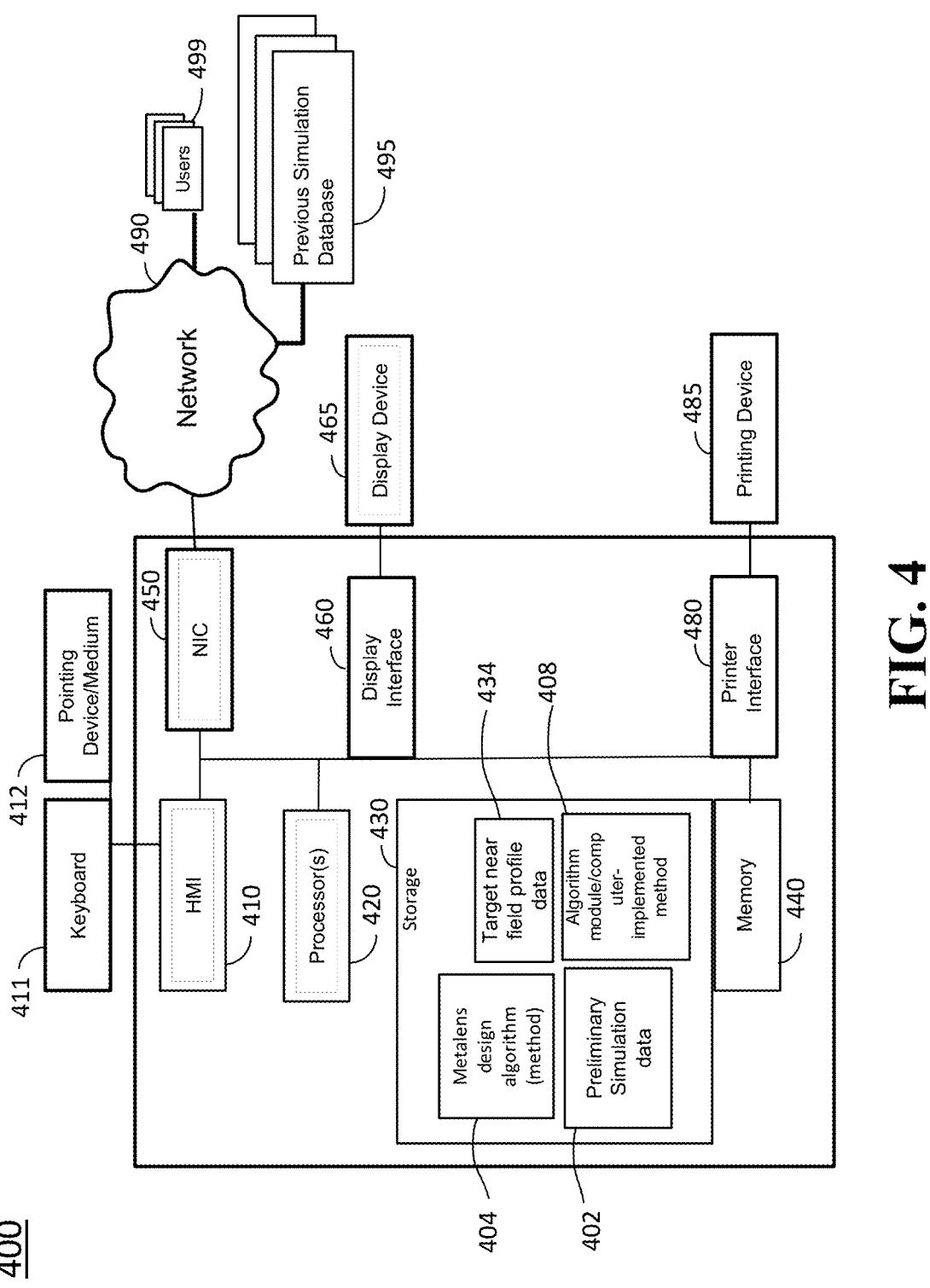
FIG. 4 shows a metalens design system, according to embodiments of the present invention.

FIG. 4 shows a block diagram of a metalens design system 400 according to some embodiments of the present disclosure. The system 400 may include a human machine interface (HMI) 410 connectable with a keyboard 411 and a pointing device/medium 412, one or more processors 420, a storage device 430, a memory 440, a network interface controller 450 (NIC) connectable with a network 490 including local area networks, wireless networks and internet network, a display interface 460 connected to a display device 465, a printer interface 480 connectable with a printing device 485. In the following, the one or more processors 420 may be referred to as a processor 420 for convenience.

The memory 440 may be one or more memory units, operating with the storage 430 that stores computer executable programs (algorithm codes) in connection with the processor 420. The system 400 may receive input data including preliminary simulation data from user(s) 499 or previous simulation database 495 via the network 490 connected to the NIC 450. The NIC 450 includes a receiver and transmitter to connect to the network 490 via wired-networks and via wireless-networks (not shown). When the system 400 receives the input data, the system 400 provide the design parameters of a metalens by performing a metalens design algorithm 404 stored in the storage 430 using the preriminary simulation data 402, the target near field profile data 434 and dynamic programing algorithm module 202 by using the processor 420 and the memory 440. The storage 430 may include an algorithm module 408 as a computer-implemented method that is configured to execute the metalens design algorithm 404 using the preliminary simulation data 402 and the target near field profile data 434 including target near field phase distributions.

Figure 5:
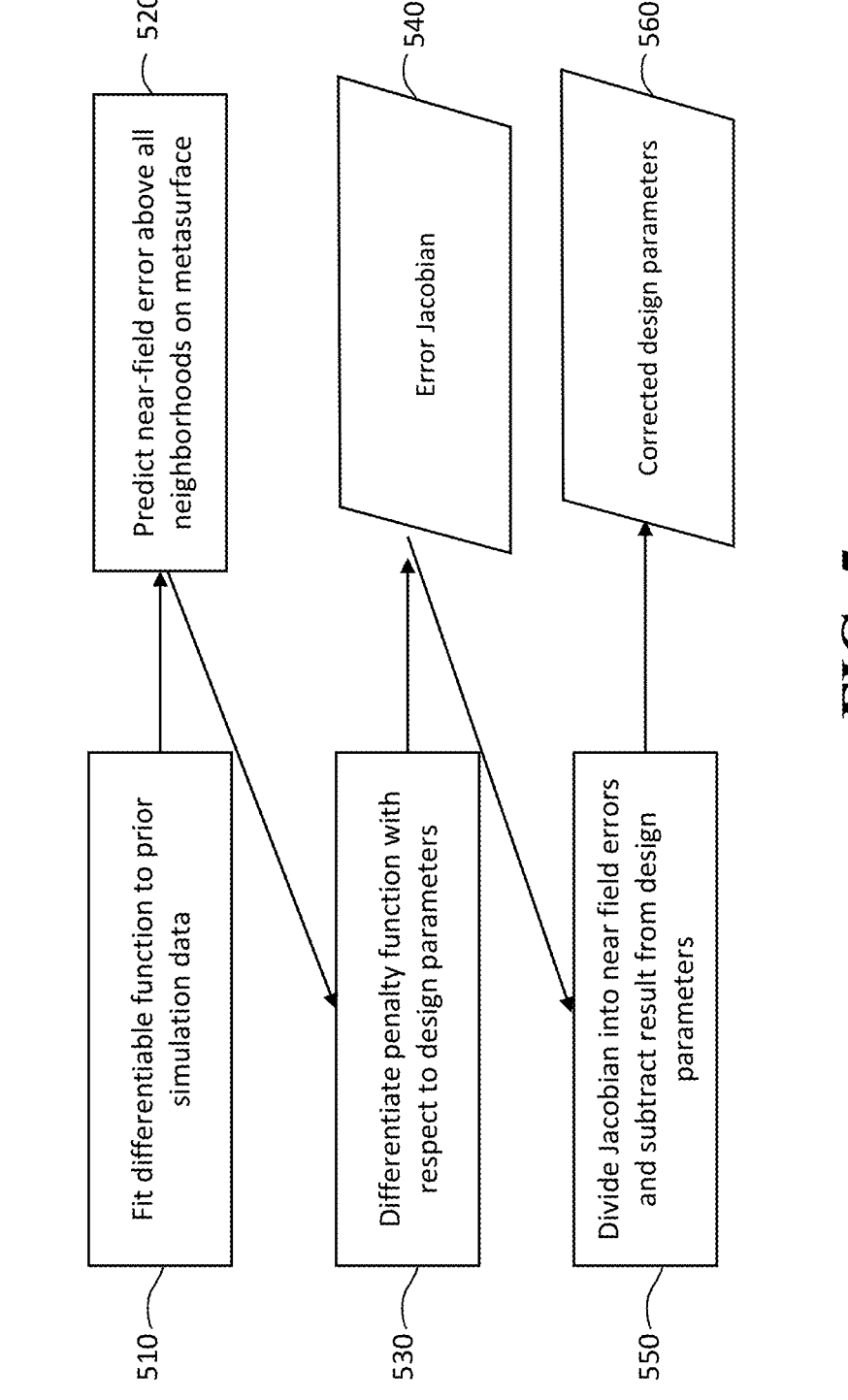
FIG. 5 flowcharts the metalens design algorithm, according to embodiments of the present invention.

FIG. 5 is s a flowchart 500 describing the metalens design algorithm 404: We approximate the unknown true near field function f* with a differentiable interpolator $f(\theta_1, \ldots, \theta_d)$ 510, fitted to the simulation data 326 of d-unit neighborhood supercells (d-unit supercells). The interpolator f provides us with both near field predictions and partial derivatives of local near field values with regard to neighborhood design parameters $\theta_1, \ldots, \theta_d$. We use f to calculate the near field error 520 of every overlapping neighborhood on the metasurface. We choose a differentiable penalty function P() for differences between the target near field radiation distribution and the near field provided by a candidate metalens design, and calculate its partial derivatives 530 with regard to all design parameters $\Theta = \pm\{\theta_1, \ldots, \theta_n\}$, n>>d, using the derivatives of f. For example, P can be the squared error in local phase delays, integrated over the entire near field. The partial derivatives are arranged into a Jacobian matrix 540. At design time, we use this Jacobian to minimize the penalty function via Newton iterations 550 which jointly optimize all design parameters 560. Assuming that the near field at any point depends on a limited neighborhood of the metalens, each Newton iteration reduces to solving a banded system of linear equations, which can be done in O(n) time and space complexity. All examples considered in this specification, each involving thousands of cells, were fully optimized in <1 second, whereas the time it takes to simulate any of these meta lenses can be hours or days. In other words, a step is performed for computing a differentiable mapping function of the d-unit supercells that predict the near-field over the unit cell at the center of the supercell from the design parameters of all the nanostructures in the supercell, by fitting an interpolator to preliminary simulation data of the d-unit supercells. In this case the computing step continues until a scale of the design parameter corrections falls below fabrication tolerances. Further, in the computing step, an interpolator function may be used to predict a near field phase distribution over each of the unit cells, where the computing step continues until the near field phase distribution matches the target near field phase distribution within a target error tolerance.

Further, the d-units supercells are different combinations of orientations of the set of nano-fins, where the interaction of each of the d-unit supercells with an incident wavefront is simulated by solving Maxwell's equations.

Figures 6A, 6B, 6C:
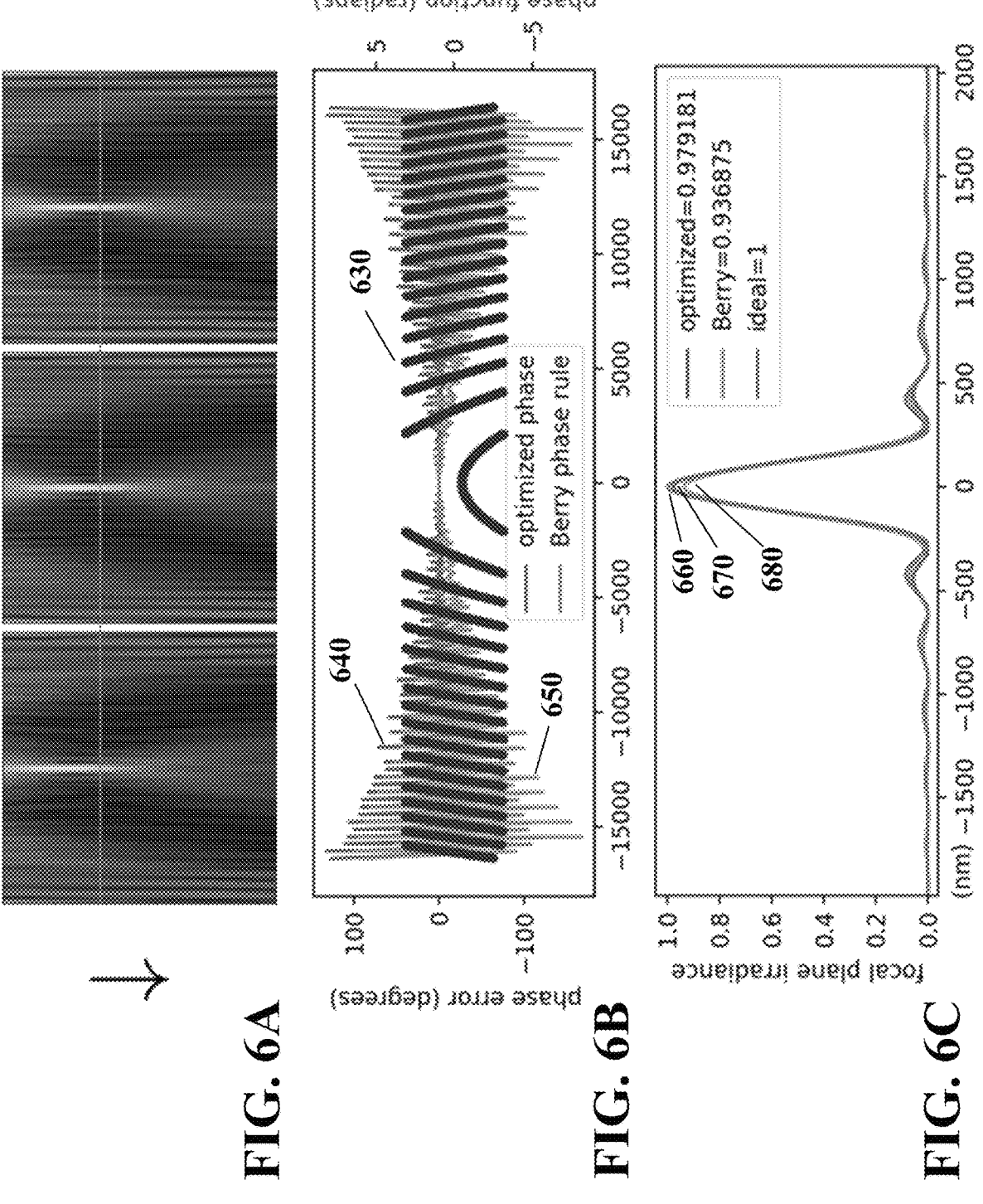
FIG. 6A shows the error incurred when predicting near field phase delays over a unit cell via Pancharatnam-Berry phase theory (PB)
FIG. 6B shows the error incurred when predicting near field phase delays over a unit cell by choosing the closest 3-cell supercell in the simulation dataset.
FIG. 6C shows the error incurred when predicting near field phase delays over a unit cell by averaging the two closest 3-cell supercells in the simulation dataset.

For example, FIG. 6A depicts far-field propagation intensities from full FDTD simulations of small NA=0.937 metalenses designed via (left to right): UCD with the PB phase rule; optimization of near-field phase by the present invention (+7.8% focal efficiency); and optimization of both near-field phase phase and amplitude by the present invention (+8.1%). Optimization also results in a device with a better focal depth. FIG. 6B depicts the target phase distribution (thick dark line 630) and realized phase error of an NA=0.8 metalens, optimized at near field points every 10 nm; in this case the initial phase error (high amplitude jagged line 640) is minimized (low amplitude dark thin line 650) but not zeroed, because the target phase oscillates more rapidly than the device physics can provide. Nonetheless the far field intensity distribution plotted in FIG. 6C shows that focusing efficiency is improved and is within 3% of the theoretical limit, illustrating ideal case 660, optimized case 670 and PB case 680.

The metasurfaces described in this invention are arrangements of nanostructure in grids of unit cells according to a regular tiling, usually rectangular or hexagonal, less commonly triangular or phyllotactic (e.g., the double-spiral pattern seen in sunflowers). In other words, the metasurface is arranged into grids of unit cells that partition a plane into rectangular, hexagonal, triangular or phyllotactic shapes.

Each unit cell contains a photonic nanostructure resting on or in a substrate. Commonly the nanostructure is a dielectric such as $SiO_2$ or a wave-guide such as $TiO_2$. Typically the cell's planar dimensions are smaller than the operating wavelengths of the device; the nanostructure's vertical dimension has no such limit. A neighborhood around a central unit cell can be defined as that cell plus any edge-adjacent cells and optionally corner-adjacent cells, and possibly their neighbors as well if the device physics support longer-range interactions. The figures show examples with $TiO_2$ rectangular nano-prisms set at various orientations within their cells.

The physical nanostructure that is specified inside each cell can be a rectangular nano-prism, elliptical nano-pillar, split-ring structure (e.g., "c"-shaped resonators), a hole in the substrate, an H- or I-beam shaped nano-pillar, a nano-pillar with a cross-shaped cross sections, or a more complex shape. Typically the nanostructure is formed of a single material, but layerings of multiple materials are possible. Each nano-structure is described by a small number of design parameters that specify its geometry and composition. The figures show examples where the design parameters are the orientation angles and two of the three rectangular prism dimensions.

Figures 7A, 7B, 7C, 7D:
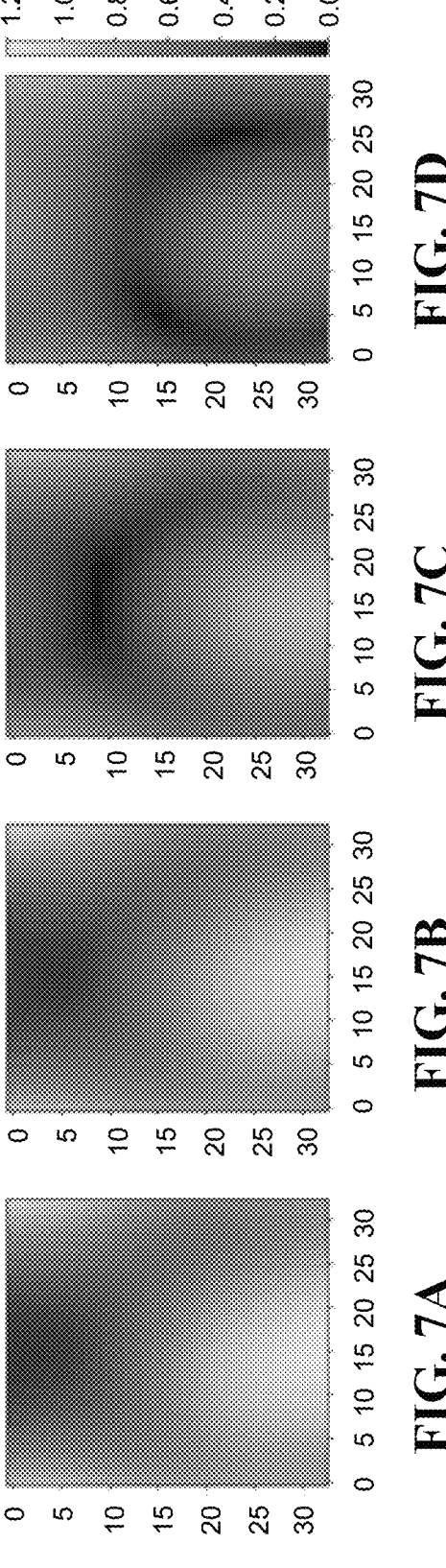
FIG. 7A shows the error predicting the near field over the cent error of a 3×3 supercell near field distribution the PB theory.
FIG. 7B shows the error incurred when using an interpolator trained on 1×3 supercells.
FIG. 7C shows the error incurred when averaging interpolations from 1×3 and 3×1 supercells.
FIG. 7D shows the result of linear regression on these interpolations.

Differentiable interpolator functions (differentiable mapping functions) are used for predicting the near field over a unit cell from its design parameters and those of other cells in its neighborhood. The function is fitted to simulation data. Suitable functions include spline interpolators, redial basis functions, neural networks, logistic regressors, rational polynomial approximators. The figures show examples where the function is a barycentric interpolator (a very simple spline) applied to the simulation data points whose design parameters are closest to the interpolation query. E.g., the space of possible neighborhood design parameters, $\square^d$, is partitioned into simplicies (d-dimensional triangles) whose vertices coincide with simulated neighborhoods. Given a query about a novel neighborhood, we find the simplex that contains its design parameters, and return a weighted average the simulation results attached to the vertices of the simplex, the weights determined by their distance from each simulation's similarity to the query. Since the number of simulations needed to train an interpolator can grow exponentially with the number of independent design parameters, in some cases it is useful to partition each two-dimensional supercell into a multitude of overlapping one-dimensional groups of unit cells, fit the interpolation function to predict their near fields, and use linear regression to combine the results. For example, FIG. 7A shows the error predicting the near field over the center of a 3×3 supercell near field distribution the PB theory; FIG. 7B shows the error incurred when using an interpolator trained on 1×3 supercells; FIG. 7C shows the error incurred when averaging interpolations from 1×3 and 3×1 supercells; and FIG. 7D shows the result of linear regression on these interpolations. Darker is better. In this case, the interpolations are performed for one-dimensional subsets of the d-unit supercells to obtain interpolation functions and the obtained interpolation functions are averaged to provide predictions and gradients for two-dimensional d-unit supercells.

The above-described embodiments of the present disclosure can be implemented in any of numerous ways. For example, the embodiments may be implemented using hardware, software or a combination thereof. Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A computer-implemented method for designing a metalens having a metasurface including nano-structures arranged on a substrate based on preliminary simulation data, wherein the method uses a processor coupled with a memory storing a target near field profile, the preliminary simulation data of the metalens and instructions implementing the method, wherein the preliminary simulation data represent design parameters including geometry and orientation angle with respect to the nano-structures on the metalens, wherein the instructions, when executed by the processor, carry out at steps of the method, comprising:

partitioning the nano-structures into overlapping d-unit supercells such that every non-perimeter nano-structure is at a center of one d-unit supercell;

computing a differentiable mapping function of the d-unit supercells that predicts the near-field over the unit cell at the center of the supercell from the design parameters of all the nanostructures in the supercell, by fitting an interpolator to preliminary simulation data of the d-unit supercells;

jointly tuning the design parameters of all unit cells in the metalens to better approximate a target near field distribution over the entire metalens, by using a Jacobian of partial derivatives provided by the mapping function to solve for a locally optimal correction of all design parameters; and generating a fabricable design of the metalens based on the optimized parameters.

2. The method of claim 1, wherein the metasurface is arranged into grids of unit cells that partition a plane into rectangular, hexagonal, triangular or phyllotactic shapes.

3. The method of claim 2, wherein the phyllotactic is formed by a double-spiral pattern.

4. The method of claim 1, wherein the substrate is made from silicon dioxide.

5. The method of claim 1, wherein the nano-structures are made from titanium dioxide.

6. The method of claim 1, wherein the computing step continues until a scale of the design parameter corrections falls below fabrication tolerances.

7. The method of claim 1, wherein in the computing step, an interpolator function is used to predict a near field phase distribution over each of the unit cells.

8. The method of claim 7, wherein the computing step continues until the near field phase distribution matches the target near field phase distribution within a target error tolerance.

9. The method of claim 1, wherein interpolations are performed for one-dimensional subsets of the d-unit supercells to obtain interpolation functions and the obtained interpolation functions are averaged to provide predictions and gradients for two-dimensional d-unit supercells.

10. The method of claim 1, wherein the d-unit supercells are different combinations of orientations of the set of nano-fins, wherein the interaction of each of the d-unit supercells with an incident wavefront is simulated by solving Maxwell's equations.

* * * * *